T. C. COLT.
APPARATUS FOR PRODUCING HOLLOW STRUCTURES OF CONCRETE AND THE LIKE.
APPLICATION FILED AUG. 20, 1921.

1,437,960.

Patented Dec. 5, 1922.
5 SHEETS—SHEET 4.

Thomas C. Colt
INVENTOR.
BY Kraentzel and Richards,
ATTORNEYS.

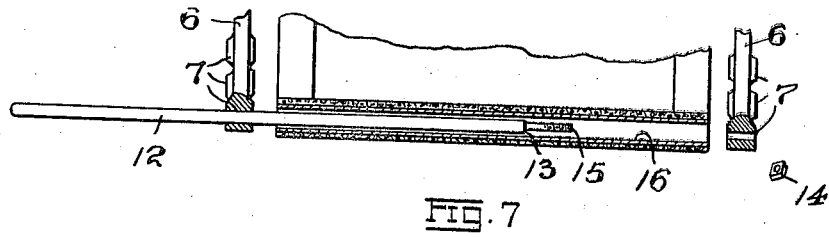
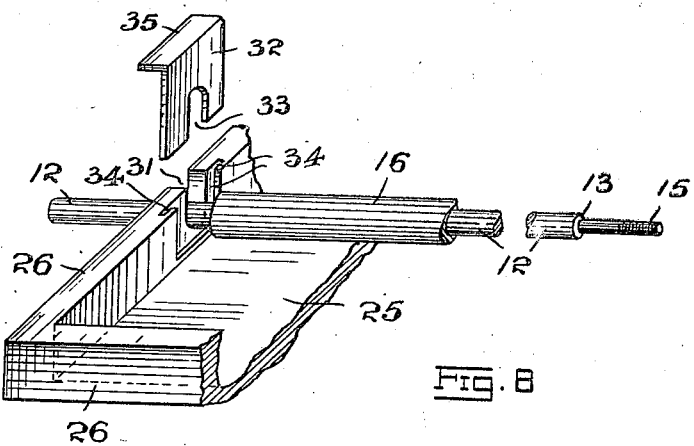
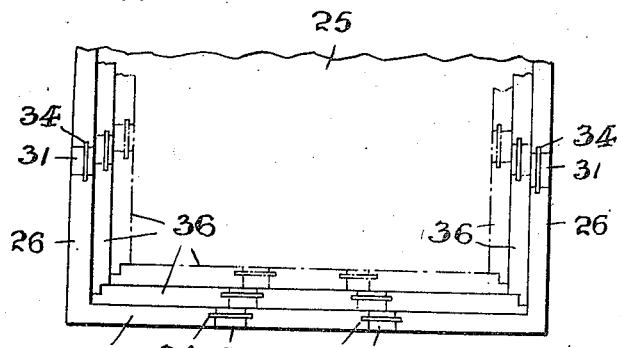

Patented Dec. 5, 1922.

1,437,960

UNITED STATES PATENT OFFICE.

THOMAS CLYDE COLT, OF EAST ORANGE, NEW JERSEY.

APPARATUS FOR PRODUCING HOLLOW STRUCTURES OF CONCRETE AND THE LIKE.

Application filed August 20, 1921. Serial No. 493,777.

*To all whom it may concern:*

Be it known that I, THOMAS C. COLT, a citizen of the United States, residing at East Orange, in the county of Essex and State of New Jersey, have invented certain new and useful Improvements in Apparatus for Producing Hollow Structures of Concrete and the like; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvement in concrete construction; and, the present invention has reference, more particularly, to a novel construction of molding apparatus, for the purpose of producing hollow structures of concrete or similar material.

The present invention has for its principal objects to provide a novel and simply constructed apparatus or machine comprising a rotary mechanism, carrying suitable detachable re-enforcing elements or columns, adapted to be imbedded in the concrete, and a mold-member, movable beneath said mechanism and toward the said re-enforcing elements or columns, the various devices and parts of the apparatus being arranged and operating in a manner, that the walls of the hollow concrete structure are intermittently produced.

Other objects of the present invention not at this time more particularly enumerated, will be clearly understood from the following detailed description of the present invention.

With the various objects of the present invention in view, the said invention consists, primarily, in the novel molding apparatus or machine hereinafter set forth; and, the said invention consists, furthermore, in the novel arrangements and combinations of the various devices and parts, as well as in the details of the construction of the said parts, all of which will be more fully described in the following specification, and then finally embodied in the clauses of the claims, which are appended to and which form an essential part of the said specification.

The invention is clearly illustrated in the accompanying drawings, in which:—

Figure 1 is a side elevation of a molding apparatus or machine, showing one embodiment of the principles of the present invention; Figure 2 is a top or plan view of the same; and Figure 3 is a front elevation of the apparatus or machine, certain portions of the same being represented in section. Figure 4 is a horizontal sectional representation of a finished hollow concrete structure made in the apparatus or machine shown in said Figures 1, 2 and 3.

Figure 7 is a detailed sectional view of the finished concrete structure, and certain parts of the apparatus or machine, said view showing the manner of disconnecting the finished or partly finished structure from the apparatus or machine; and Figure 8 is a detail view, in perspective, of certain portions of the apparatus or machine, and of a portion of the mold used therewith.

Figure 9 is a plan view of a fragmentary portion of the mold, showing in connection therewith one means for reducing the size of the interior concrete-receiving chamber of the mold.

Similar characters of reference are employed in the above described views to indicate corresponding parts.

Figure 2:
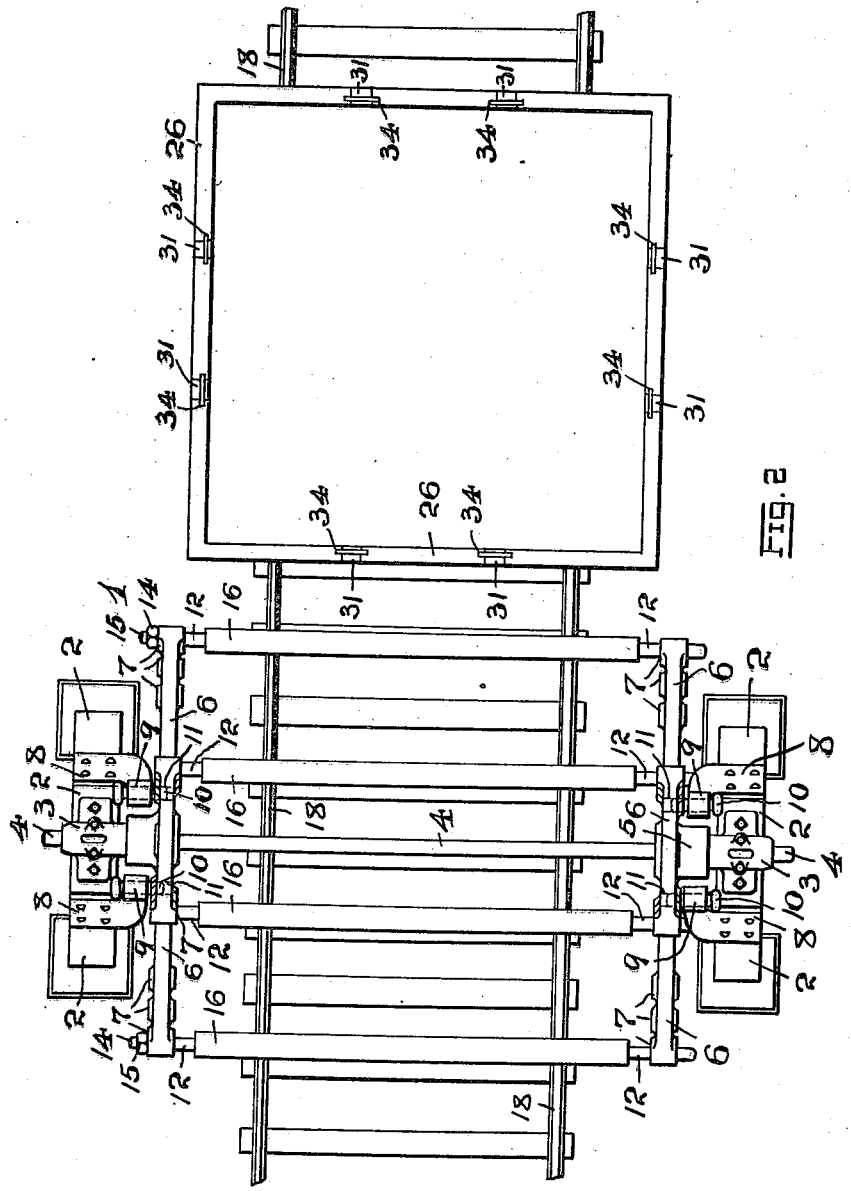

Referring now to the said drawings, the reference-character 1 indicates in general a molding apparatus or machine made according to and embodying the principles of the present invention, the same comprising a pair of suitably formed standards 2, each standard carrying upon its upper portion a bearing 3, in which bearings is mounted a main shaft 4. Suitably mounted upon said main shaft, between the said bearings 3, are a pair of spider-frames, the central portions 5 of which are rotatably disposed upon said shaft 4, although, if desired, the said spider-frames may be secured in fixed positions upon said shaft, in which case the end-portions of the shaft are rotatably mounted in the said bearings, 3, as will be clearly evident. As shown, each spider-frame is made with a series of arms, 6, radiating from the central portion or hub 5 of each spider-frame, said arms 6 being provided at or near their outer end-portions with a series of holes or perforations, as 7. To prevent rotation of the said spider-frames, at the proper time, and for the purposes hereinafter more fully stated, each standard 2 is provided with a pair of upwardly projecting brackets 8, each bracket being provided with a tubular end-portion or member 9, in which is movably disposed a suitably formed stop-pin 10, one end of which has an enlargement providing a fingerpiece, and the other end of each stop-pin being adapted to be inserted in a correspondingly located perforation 11 in the central portion or hub of the spider-frame, as indicated in dotted outline in Figure 2 of the drawings. Suitably mounted within the oppositely located holes or perforations 7 of the oppositely placed spider-arms 6 are the respective end-portions of a series of horizontal supporting rods 12, held in place with one of the spider frames by an off-set or shoulder 13 and a nut 14 which is screwed upon the reduced and screw-threaded end-portion 15 of each rod, as will be clearly understood from an inspection of the several figures of the drawings. Each rod 12 has removably disposed thereon, a tubular re-enforcing element or column 16 provided with suitably placed and laterally extending tying elements or fingers 17, which, with the said rods or columns, are adapted to be imbedded in the concrete for strengthening and re-enforcing the same in a manner to be hereinafter more fully set forth.

Suitably arranged beneath the apparatus or machine, and between the standards 2, is an arrangement of tracks 18 adapted to receive the flanged wheels 19 of a mold-carrying truck. This truck consists, essentially, of a base 20, suitably mounted with relation to the wheels 19, being provided with a centrally disposed and internally screw-threaded hub 21 in which is rotatably disposed the shank-portion of a lifting screw 22 having its upper end 23 suitably and operatively connected with a receiving socket, as 24, extending from the lower part or base 25 of a suitably formed mold-member or other suitable element into which the semi-fluid concrete mass is poured, and allowed to set and harden in the space formed by said base 25 and the surrounding side-walls 26.

At its corners, the base 25 has downwardly projecting socket-members, as 27, in which are arranged and suitably secured therein, the upper ends of guide-rods 28, said rods having their lower ends extending into and being movably disposed in correspondingly located guide-sockets 29, or the like, at the corners of the base 20.

Means is provided in connection with the screw 22, in the form of an enlargement, as 30, for the turning of said screw in either direction within the screw-threaded hub 21, whereby the mold-member can be desirably raised or lowered, as may be necessary during the molding operations of the apparatus or machine. In its opposite side-walls 26, the mold-member is formed with suitable slots or openings, as 31, for the reception of the end-portions of the previously mentioned horizontal rods 12, in the manner to be presently described. The reference characters 32 indicate suitably formed closing elements, provided with the elongated openings, 33, adapted to be fitted over the end-portions of the rods 12, when said elements are disposed in the receiving channels or grooves 34 in said side-walls 26, for thus closing the open portions in said side-walls, against the escape or discharging of the semi-fluid concrete-mixture from the mold, as will be clearly understood from an inspection of Figure 8 of the drawings. As shown in said Figure 8, each closing element 32 is made with a right-angled retaining member, as 35, which rests upon the upper edge of the side-walls 26, to close the said channels or grooves 34 against clogging up with the semi-fluid concrete-mixture, when the latter is carelessly poured into the mold.

Various sizes of mold-members may be produced, as will be seen from an inspection of Figure 9 of the drawings, by the disposition within the said mold-member of a series of space-reducing elements, as 36, according to the size of the concrete structure that may be desired.

Having in the foregoing set forth and described the general arrangements and constructions of the various devices and parts of the apparatus or machine, I will now briefly set forth the manner of operating the same for producing hollow concrete elements, in the form of hollow blocks, hollow post, and other desirable hollow structural elements.

Figure 1:
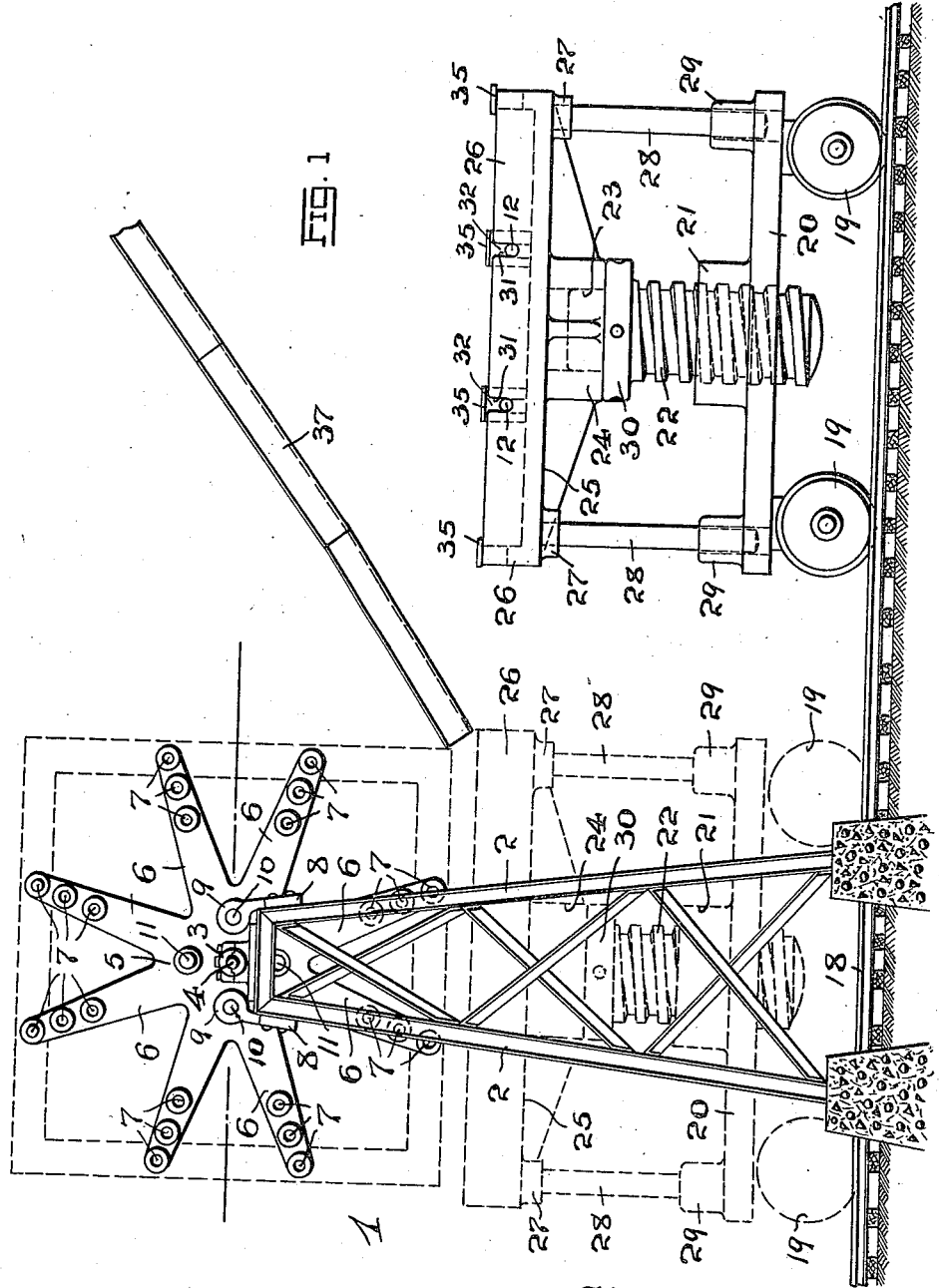

The combined truck and mold-member, as will be seen from an inspection of Figure 1. are removed to a position outside of and from between the standards or frames 2 of the apparatus. The previously-mentioned tubular re-enforcing members or columns 16 are slipped upon the supporting rods 12, and the latter suitably connected with the spider-arms 6. The stop-pins 10 are then caused to engage the corresponding holes or perforations 11 of the two spider-frames, the latter having been previously rotated into the proper position indicated in said Figure 1.

Figure 3:
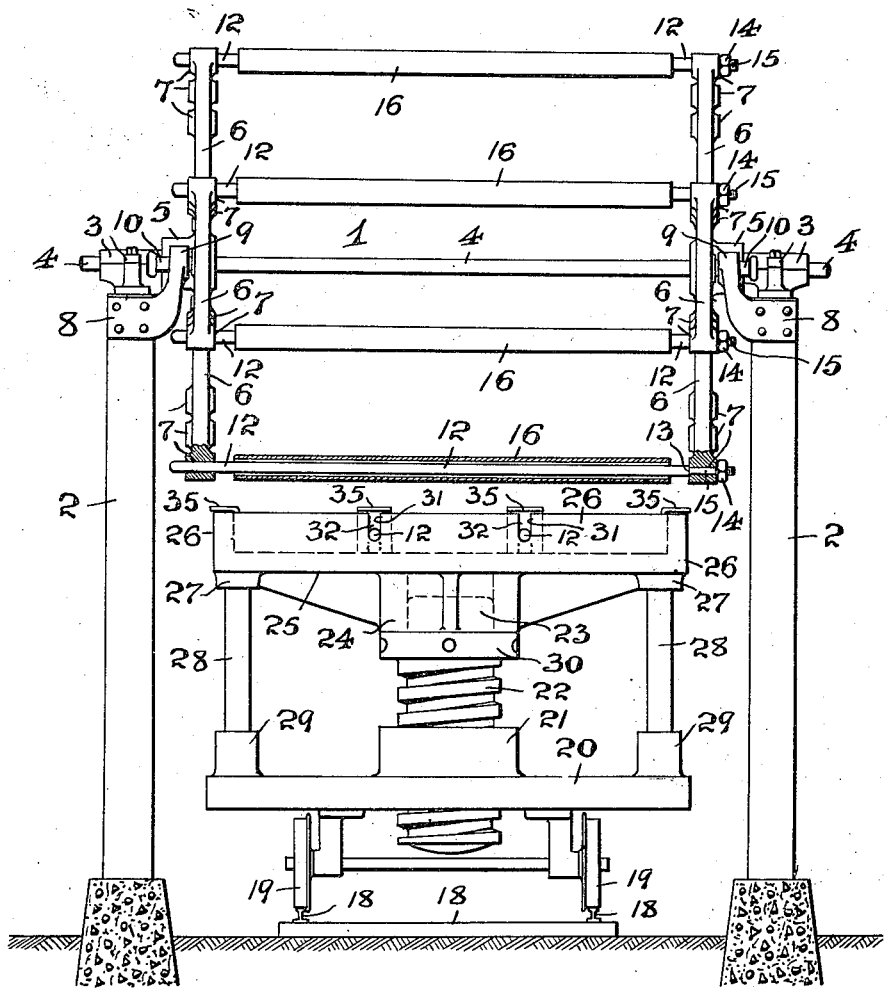
Figure 4:
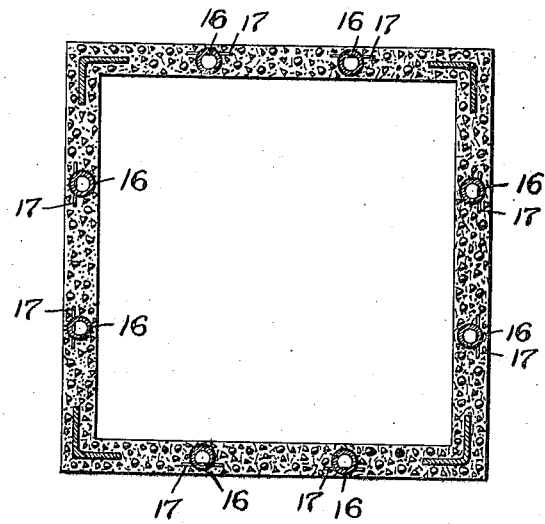
Figure 6:
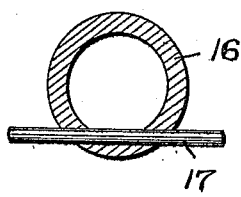
Figure 6 is a vertical cross-section of the same, said section being taken on line 6—6 in said Figure 5, and both of said views being made on an enlarged scale.
Figure 5:
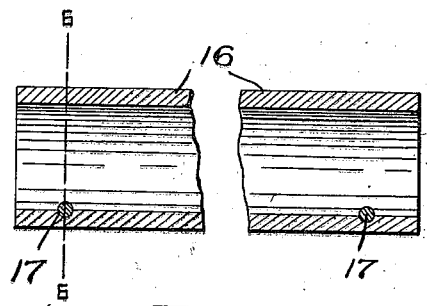
Figure 5 is a longitudinal vertical sectional representation of fragmentary portions of one of the re-enforcing elements or columns, used with the apparatus or machine.

The combined truck and mold-member are now moved into a position between the two standards, as indicated in the dotted outline in said Figure 1, and by means of the lifting screw the mold-member is sufficiently raised and adjusted until the open portions 31 enter over the respective end-portions of the two lower-most supporting rods 12, with the re-enforcing elements or columns 16 upon said rods 12, being disposed directly between the opposite side-walls 26 of the mold-member, as will be evident from an inspection of Figures 3 and 8 of the drawings. The closing elements 32 are now inserted in position in the grooves or channels 34, to close up the openings 31. Concrete or other material in a properly fluid or semi-fluid condition is poured by means of a pouring chute 37, or otherwise, into the mold-member, surrounding the tubular re-enforcing element or columns therein, until the mold-member has been fully filled.

The concrete mass is thereupon allowed to set, until it has become sufficiently hard, but not entirely so, to cause the mass to maintain its shape and to allow the mold-member to be lowered and removed from the partially hardened mass by the turning of the screw in the reverse direction.

After the mold-member has been sufficiently lowered, the stop-pins are withdrawn from their retaining engagement with the spider-elements, so that the latter can be sufficiently rotated to bring the next set of supporting rods 12 and tubular re-enforcing elements or hollow posts 16 in place to be received between the side-walls of the mold-member, when the latter is again raised by the turning of the lifting screw 22. The closing plates or elements 32 are again inserted in place, and the stop-pins again brought into holding engagement with the rotated spider-frames, whereupon the pouring operation is once more proceeded with until the mold-member has been again filled. The mass is again allowed to set and partially harden, the last-made member being connected with the first-made member, along one of its marginal edges, as will be evident. After again lowering the mold-member, and removing it from the last-named mass, and removing the stop-pins, the spider-frames can be once more rotated and the mold-members and other parts brought into their operative relations for the next pouring step, and so on until the finished hollow concrete or other structure has been completed.

The various nuts 14 are now removed by unscrewing to permit of the withdrawal of all the supporting rods 12, and to allow the finished product to be supported, for removal from the apparatus, directly upon the combined truck and mold-member.

By withdrawing the stop-pins, and by lifting the main shaft 4 from the bearings 3, the spider-frames may be lifted out of the way, to allow the truck, and the finished product thereon to be moved from between the standards 2 to the position shown at the right hand of said Figure 1, as will be evident.

While in the present construction, I have shown the apparatus or machine made to permit of making square or rectangular hollow structures, it will be evident that by varying the number of the radiating arms of the spider-members, and the parts connected therewith, hollow structures of different polygonal shapes can be readily made.

I am fully aware that various changes may be made in the general arrangements and combinations of the various devices and parts, as well as in the details of the construction of the said parts, without departing from the scope of the present invention as set forth in the foregoing specification, and as defined in the clauses of the claims which are appended thereto. Hence, I do not limit my present invention to the exact arrangements and combinations of the various devices and parts as described in the foregoing specification, nor do I confine myself to the exact details of the construction of the said parts, as illustrated in the accompanying drawings.

I claim:—

1. In an apparatus for producing concrete structures, in combination with a supporting means for the mounting thereon of a re-enforcing element, a mold-member movably disposed beneath said re-enforcing elment supporting means, and mechanism connected with and co-operating with said mold-member for moving the same toward the carrying means to bring the re-enforcing element into position within the mold-member.

2. In an apparatus for producing concrete structures, in combination with a rotatably disposed supporting means for mounting thereon a re-enforcing element, a mold-member movably disposed beneath said re-enforcing element supporting means, and mechanism co-operating with said mold-member for moving the same toward the carrying means to bring the re-enforcing element into position within the mold-member.

3. In an apparatus for producing concrete structures, in combination with a supporting means for the mounting thereon of a re-enforcing element, a truck movable beneath said supporting means, a mold-member carried upon said truck, and mechanism co-operating with said mold-member for raising the same toward the carrying means to bring the re-enforcing element into position within the mold-member.

4. In an apparatus for producing concrete structures, in combination with a rotatably disposed means for mounting thereon a re-enforcing element, a truck movable beneath said supporting means, a mold-member carried upon said truck, and mechanism co-operating with said mold-member for raising the same toward the carrying means to bring the re-enforcing element into position within the mold-member.

5. In an apparatus for producing concrete structures, in combination with a pair of standards, bearings carried by said standards, a carrying element rotatably mounted with relation to said bearings, said element comprising a pair of spider-frames, and rods connected with and extending horizontally between said spider-frames, each rod being adapted to have mounted thereon a tubular re-enforcing element, a mold-member movably disposed beneath said spider-frames, said rods and the re-enforcing elements on said rods, and mechanism connected with and co-operating with said mold-member for moving the same toward said spider-frames to bring some of the re-enforcing elements into position within the mold-member.

6. In an apparatus for producing concrete structures, in combination with a pair of standards, bearings carried by said standards, a carrying element rotatably mounted with relation to said bearings, said element comprising a pair of spider-frames, and rods connected with and extending horizontally between said spider-frames, each rod being adapted to have mounted thereon a tubular re-enforcing element, a truck movable between said standards so as to be brought beneath said spider-frames, said rods and the re-enforcing elements on said rods, a mold-member carried upon said truck, and mechanism connected with and co-operating with said mold-member for moving the same toward said spider-frames to bring some of the re-enforcing elements into position within the mold-member.

7. In an apparatus for producing concrete structures, in combination with a pair of standards, bearings carried by said standards, a carrying element rotatably mounted with relation to said bearings, said element comprising a pair of spider-frames, and rods connected with and extending horizontally between said spider-frames, each rod being adapted to have mounted thereon a tubular re-enforcing element, a mold-member movably disposed beneath said spider-frames, said rods and the re-enforcing elements on said rods, mechanism connected with and co-operating with said mold-member for moving the same toward said spider-frames to bring some of the re-enforcing elements into position within the mold-member, and means connected with said standards for engagement with the spider-frames to maintain fixed non-rotatable positions of said carrying element.

8. In an apparatus for producing concrete structures, in combination with a pair of standards, bearings carried by said standards, a carrying element rotatably mounted with relation to said bearings, said element comprising a pair of spider-frames, and rods connected with and extending horizontally between said spider-frames, each rod being adapted to have mounted thereon a tubular re-enforcing element, a truck movable between said standards so as to be brought beneath said spider-frames, said rods and the re-enforcing elements on said rods, a mold-member carried upon said truck, and mechanism connected with and co-operating with said mold-member for moving the same toward said spider-frames to bring some of the reenforcing elements into position within the mold-member, and means connected with said standards for engagement with the spider-frames to maintain fixed non-rotatable positions of said carrying element.

9. In an apparatus for providing concrete structures, in combination with a pair of standards, bearings carried by said standards, a carrying-element rotatably mounted with relation to said bearings, said element comprising a pair of spider-frames, and rods connected with and extending horizontally between said spider-frames, each rod being adapted to have mounted thereon a tubular re-enforcing element, a truck movable between said standards so as to be brought beneath said spider-frames, said rods and the reinforcing elements on said rods, a screw-receiving member carried by said truck, a lifting screw working in said screw-receiving member carried by said truck, means for actuating said screw and moving said mold-member toward said spider-frames to bring some of the re-enforcing elements into position within the mold-member.

10. In an apparatus for producing concrete structures, in combination with a pair of standards, bearings carried by said standards, a carrying-element rotatably mounted with relation to said bearings, said element comprising a pair of spider-frames, and rods connected with and extending horizontally between said spider-frames, each rod being adapted to have mounted thereon a tubular re-enforcing element, a truck movable between said standards so as to be brought beneath said spider-frames, said rods and the re-enforcing elements on said rods, a screw-receiving member carried by said truck, a lifting screw working in said screw-receiving member, a mold-member carried by said screw, means for actuating said screw and moving said mold-member toward said spider-frames to bring some of the re-enforcing elements into position within the mold-member, a series of guiding sockets carried by said truck, and guide-rods extending downwardly from said mold-member and movable in said guiding sockets.

11. In an apparatus for producing concrete structures, in combination with a pair of standards, bearings carried by said standards, a carrying-element rotatably mounted with relation to said bearings, said element comprising a pair of spider-frames, and rods connected with and extending horizontally between said spider-frames, each rod being adapted to have mounted thereon a tubular re-enforcing element, a truck movable between said standards so as to be brought beneath said spider-frames, said rods and the re-enforcing elements on said rods, a screw-receiving member carried by said truck, a lifting screw working in said screw-receiving member, a mold-member carried by said screw, means for actuating said screw and moving said mold-member toward said spider-frames to bring some of the re-enforcing elements into position within the mold-member, and means connected with said standards for engagement with the spider-frames to maintain fixed non-rotatable positions of said carrying element.

12. In an apparatus for producing concrete structures, in combination with a pair of standards, bearings carried by said standards, a carrying-element rotatably mounted with relation to said bearings, said element comprising a pair of spider-frames, and rods connected with and extending horizontally between said spider-frames, each rod being adapted to have mounted thereon a tubular re-enforcing element, a truck movable between said standards so as to be brought beneath said spider-frames, said rods and the re-enforcing elements on said rods, a screw-receiving member carried by said truck, a lifting screw working in said screw-receiving member, a mold-member carried by said screw, means for actuating said screw and moving said mold-member toward said spider-frames to bring some of the re-enforcing elements into position within the mold-member, a series of guiding sockets carried by said truck, and guide-rods extending downwardly from said mold-member and movable in said guiding sockets, and means connected with said standards for engagement with the spider-frames to maintain fixed non-rotatable positions of said carrying element.

13. In an apparatus of the character specified, a carrying element comprising a central shaft, spider-frames mounted upon said shaft, each frame comprising a centrally disposed hub and a series of spider-arms radiating therefrom, said arms being provided near their outer ends with perforations, and re-enforcing member receiving rods between said spider-arms, said rods having their end-portions, mounted in the perforations of the oppositely located spider-arms.

14. In an apparatus of the character specified, a carrying element comprising a central shaft, spider-frames mounted upon said shaft, each frame comprising a centrally disposed hub and a series of spider-arms radiating therefrom, said arms being provided near their outer ends with perforations, and re-enforcing member receiving rods between said spider-arms, said rods having their end-portions mounted in the perforations of the oppositely located spider-arms, combined with a pair of standards, and bearings in which the end-portions of said central shaft are mounted, and means connected with said standards for engagement with said spider-frames for maintaining fixed non-rotatable positions of said spider-frames.

15. In an apparatus of the character specified, a carrying element comprising a central shaft spider-frames mounted upon said shaft, each frame comprising a centrally disposed hub and a series of spider-arms radiating therefrom, said arms being provided near their outer ends with perforations, and re-enforcing member receiving rods between said spider-arms, said rods having their end-portions, mounted in the perforations of the oppositely located spider-arms, the hubs of said spider-frames being provided with stop-pin receiving perforations, combined with a pair of standards, and bearings in which the end-portions of said central shaft are mounted, brackets connected with said standards, each bracket having a tubular receiving member, and stop-pins movable in said receiving members, said stop-pins being adapted to be brought into retaining engagement with the stop-pin receiving perforations for maintaining fixed non-rotatable positions of said spider-frames.

16. In an apparatus of the character specified, a combined truck and mold-member comprising a base provided with wheels, an internally screw-threaded member connected with said base, a lifting screw working in said member, means for operating said screw, a mold-member mounted upon said screw, guiding-sockets mounted upon the base of said truck, and guide-rods extending downwardly from said mold-member and movable in said guiding sockets.

17. In an apparatus of the character specified, a combined truck and mold-member comprising a base provided with wheels, an internally screw-threaded member connected with said base, a lifting screw working in said member, means for operating said screw, a mold-member mounted upon said screw, said mold-member being provided in its opposite side-walls with receiving-openings, and a slotted and flanged closing plate removably disposed so as to close each receiving-opening.

18. In an apparatus of the character specified, a combined truck and mold-member comprising a base provided with wheels, an internally screw-threaded member connected with said base, a lifting screw working in said member, means for operating said screw, a mold-member mounted upon said screw, guiding-sockets mounted upon the base of said truck, and guide-rods extending downwardly from said mold-member and movable in said guiding sockets, said mold-member being provided in its opposite side-walls with receiving-openings, and a slotted and flanged closing plate removably disposed so as to close each receiving-opening.

In testimony, that I claim the invention set forth above I have hereunto set my hand this 17th day of August, 1921.

THOMAS CLYDE COLT.

Witnesses:
FREDK. C. FRAENTZEL,
EVA E. DESCH.